No. 791,496.

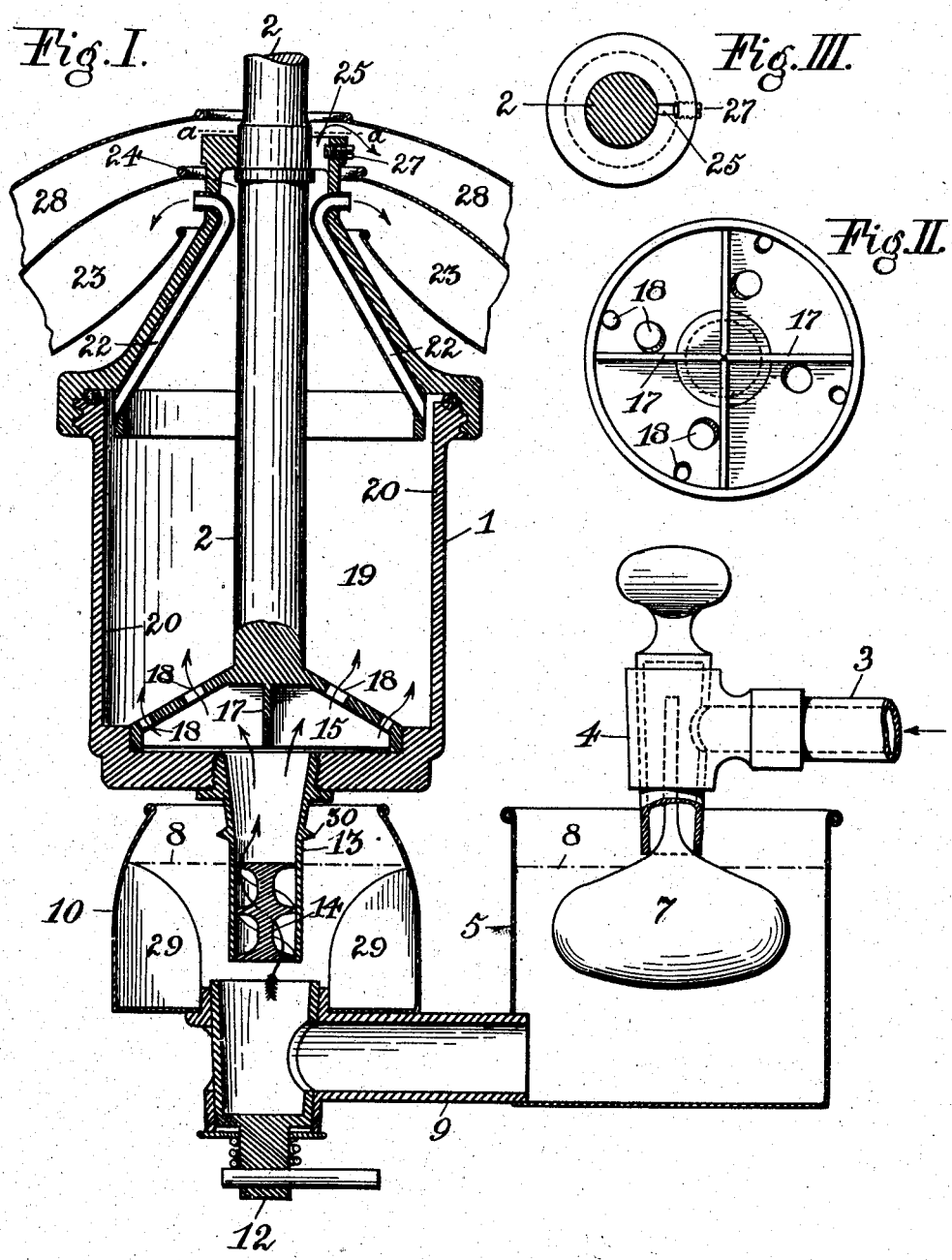

Patented June 6, 1905.

UNITED STATES PATENT OFFICE.

ANDERS PONTEN, OF BERKELEY, CALIFORNIA.

CENTRIFUGAL CREAM-SEPARATOR.

SPECIFICATION forming part of Letters Patent No. 791,496, dated June 6, 1905.

Application filed August 15, 1904. Serial No. 220,831.

*To all whom it may concern:*

Be it known that I, ANDERS PONTEN, a citizen of the United States of America, residing at Berkeley, county of Alameda, and State of California, have invented certain new and useful Improvements in Cream-Separators; and I hereby declare the following to be a full, clear, and exact description of the same, reference being had to the accompanying drawings, forming a part of this specification.

This invention relates to centrifugal cream-separating machines and to certain useful improvements therein, as hereinafter described, and illustrated by drawings that form a part of this specification.

My improvements consist in mechanical means for supplying the whole milk through the bottom of the rotary chamber, commonly called the "bowl," and in connected devices that permit a supply in this manner.

The object of my invention is to render the operation of such machinery more convenient and effective, also simplify its construction.

Referring to the drawings, Figure I is a vertical section through the operating parts of a cream-separating machine constructed according to my invention. Fig. II is a view on the bottom of the plate or flange forming the inlet-chamber of the bowl. Fig. III is a plan view on the line *a a* in Fig. I.

In the operation of cream-separators the custom is to supply the milk at the top of the bowl from a faucet leading from an elevated supply-tank. Such machines by the nature of their construction occupy a considerable height from the floor, so that the supply-tank and the means of regulation between that and the bowl makes it necessary to deliver the milk at an inconvenient height above the floor-level. To avoid this objection, I provide a construction and devices as shown in the drawings, 1 being the rotary chamber or bowl attached to a suspended shaft 2, driven by a band or other suitable means in the usual manner.

Milk is supplied from a receiving-tank by gravity through a pipe 3 and faucet 4, that discharges into a vessel 5, the quantity being regulated by a float 7, that by its buoyancy acts like a valve and maintains a level of the milk approximately on the line 8. The regulating vessel 5 is connected by a passage 9 to the supply-cup 10, set coaxial with the bowl above, a cock 12 being provided, so as to shut off the supply from the vessel 5 and permit the cup 10 to be emptied when the contents of the bowl 1 runs back into the cup 10 after the machine is stopped. At the bottom of the rotary bowl 1 is a tubular extension 13, divergent at the top and parallel at the bottom, where a helical impelling device 14 therein, in conjunction with the divergent portion of the tube 13, raises the milk from the vessel 10 into the chamber 15 when the machine is in motion. In the chamber 15 the milk follows the rapid revolutions of the bowl 1 by reason of the vanes 17 and is driven through the apertures 18 into the main chamber 19 of the bowl, where the separation of milk and cream takes place. In this chamber 19 the milk, being heavier than the cream, is separated therefrom, flowing outward to the walls 20, and escapes through the pipes or passages 22 into a collecting-chamber 23, as indicated by arrows in Fig. I. The cream being lighter in weight collects in an annular layer or stratum around the shaft 2 and is forced upward into the chamber 24, whence it escapes through an aperture 25, the size of which is regulated by a screw 27, as shown in Figs. I and III, and is collected in the chamber 28 in the usual manner. The cup 10 is provided with vanes 29 to prevent rotation of the milk therein and permit proper action of the helical device 14, which can be made in any suitable manner, as part of a screw (shown in the drawings) or with independent oblique vanes, as in a propeller. The vessels 5 and 10 are preferably made separate, so the one 10 can be emptied without disturbing the other. They may, however, be combined in one. The tube 13 has a collar or ledge 30, that throws off any milk that follows up on its outer surface. In this manner it will be seen that milk-supply can be delivered to the machine at a convenient height from the floor on which the machine stands and on which the milk is handled, in practice a level two to three feet above the floor; but if supplied through the top of the bowl the elevation for supply would have to be, including the required vessels, four to five feet above the floor and very inconvenient in decanting from hand vessels.

Having thus explained the nature and objects of my invention, what I claim as new, and desire to secure by Letters Patent, is—

1. In a centrifugal cream-separator, a separating vessel revolubly mounted from above, an inlet-tube at the bottom thereof, a helical elevator in said inlet-tube, and means to supply the fluid to be separated to said tube, substantially as specified.

2. In a centrifugal cream-separator, a separating vessel revolubly mounted from above, a milk-supply vessel beneath said separating vessel, an inlet-tube in the bottom of said separating vessel, and a helix for elevating the fluid in the supply vessel into the separating vessel, operated by the rotation of the latter, substantially as specified.

3. In a centrifugal cream-separator, a separating vessel revolubly mounted from above, a milk-supply vessel beneath said separating vessel, an inlet-tube in the bottom of said separating vessel, extending into said supply vessel, a helical elevator in said tube, and a reservoir communicating with said supply vessel, substantially as specified.

In testimony whereof I have signed my name to this specification in the presence of two subscribing witnesses.

ANDERS PONTEN.

Witnesses:
ELMER WICKES,
GEORGE MANUEL.